Sept. 23, 1924.  R. A. WILSON  1,509,386
PRESSURE RELIEF VALVE
Filed March 13, 1923   2 Sheets-Sheet 2
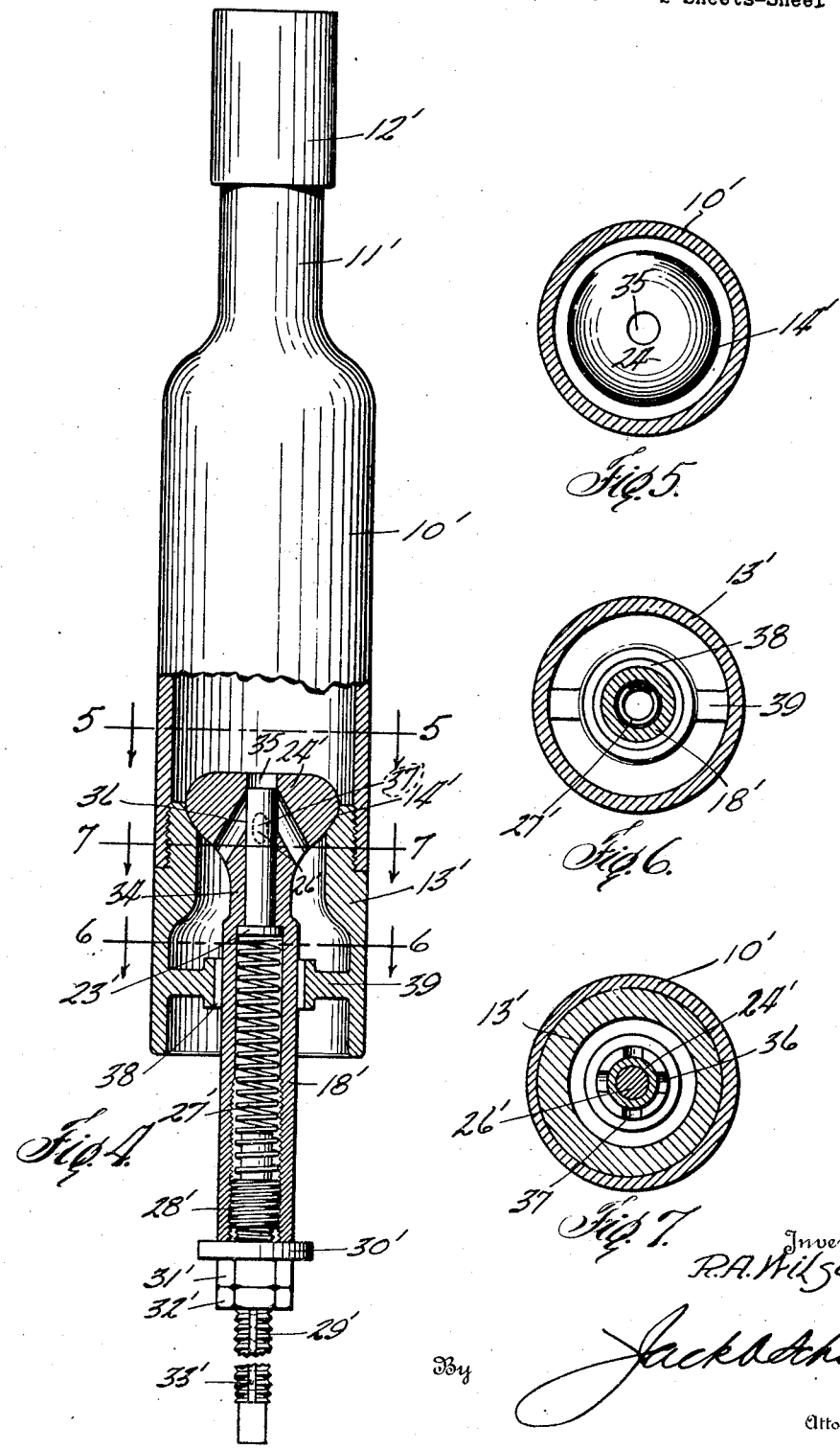

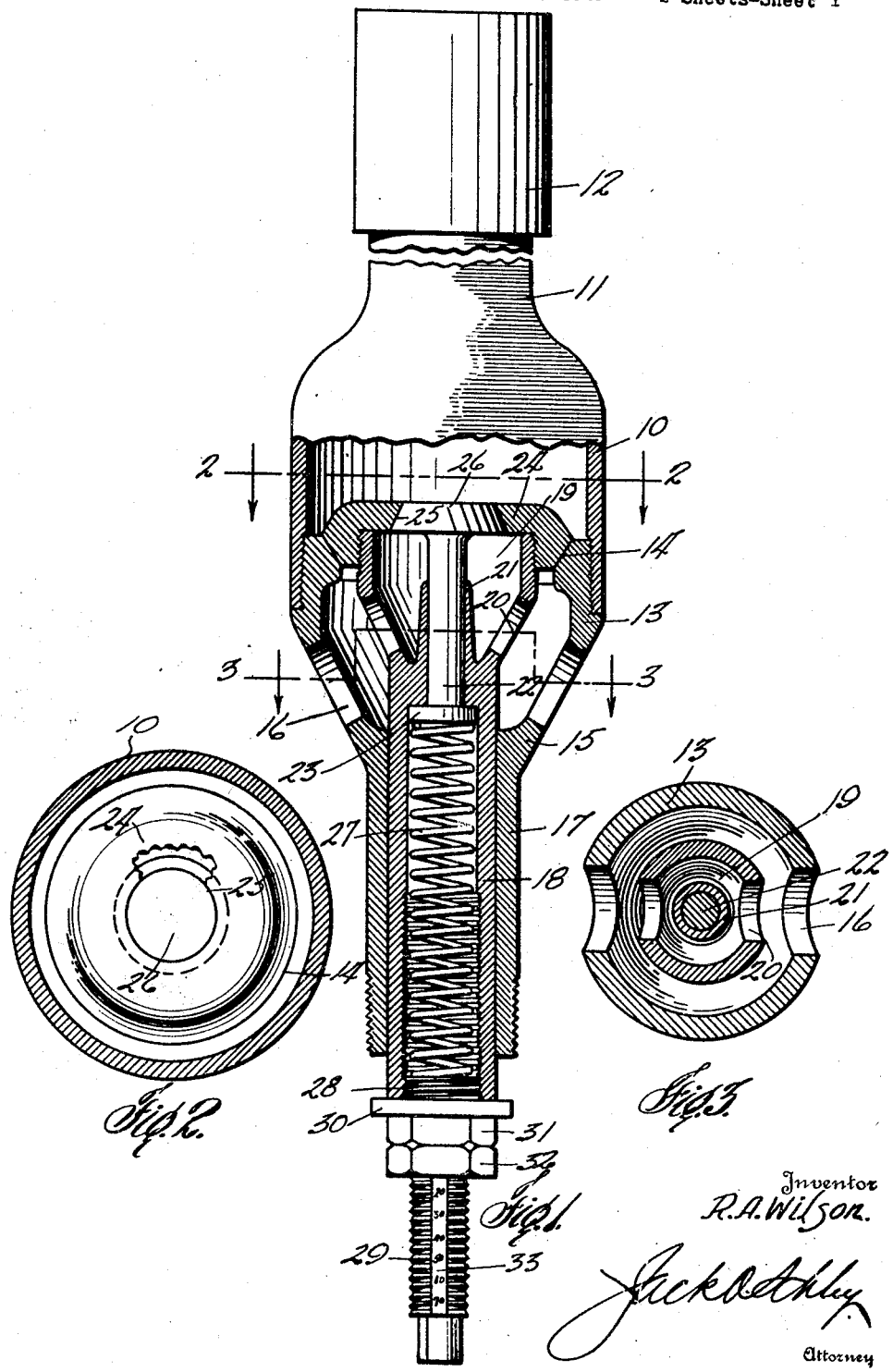

Patented Sept. 23, 1924.

1,509,386

UNITED STATES PATENT OFFICE.

ROBERT A. WILSON, OF DALLAS, TEXAS, ASSIGNOR TO GUIBERSON CORPORATION, OF DALLAS, TEXAS, A CORPORATION OF DELAWARE.

PRESSURE-RELIEF VALVE.

Application filed March 13, 1923. Serial No. 624,874.

*To all whom it may concern:*

Be it known that I, ROBERT A. WILSON, citizen of the United States of America, residing at Dallas, in the county of Dallas and State of Texas, have invented certain new and useful Improvements in Pressure-Relief Valves, of which the following is a specification.

This invention relates to new and useful improvements in pressure relief valves.

The object of my invention is to provide a valve structure for use in oil wells where it is desired to elevate the oil and to relieve the strain or surplus from the elevating medium after a maximum load has been collected, by discharging such surplus or excess below the valve.

A further object is to control a maximum load lifted by the elevating medium and to regulate such load to a desired pressure or weight.

Another object is to provide a gauge whereby the relief valve may be set to resist pressure or weight up to a predetermined point and at such point to discharge the fluid below the valve until the predetermined pressure or weight is reached.

Constructions designed to carry out the invention together with other features will be hereinafter described.

The invention will be more readily understood from a reading of the following specification and by reference to the accompanying drawings, wherein:

Fig. 1 is a broken view of a device constructed in accordance with my invention, the upper portion being in elevation and the lower portion in section, Fig. 2 is a cross-sectional view on the line 2—2 of Fig. 1, Fig. 3 is a cross-sectional view on the line 3—3 of Fig. 1, Fig. 4 is a view similar to Fig. 1, but showing a modified form of the invention, Fig. 5 is a cross-sectional view on the line 5—5 of Fig. 4, Fig. 6 is a cross-sectional view on the line 6—6 of Fig. 4, and Fig. 7 is a cross sectional view on the line 7—7 of Fig. 4.

In the drawings the numeral 10 designates a cylindrical housing having a reduced neck 11 having its upper end screw threaded into a collar 12, whereby the housing may be connected to the bottom of a well swab, boiler or other well appliance with which it is desired to use the device.

The lower end of the housing is internally screw threaded to receive the upper shouldered end of a valve cage 13 having an annular inclined valve seat 14. The cage has an inwardly inclined portion 15 in the walls of which any desired number of ports 16 are provided; and which forms a chamber below the valve seat. The portion 15 merges into the upper end of a depending sleeve 17 which has a smooth bore for receiving a tubular stem 18 adapted to slide freely in the sleeve. The stem has a flared chamber 19 at its upper end provided with ports 20 communicating with the ports 16.

The stem has an axial boss 21 extending into the chamber and a solid valve stem 22 extends thru the boss and the upper end of the stem. The stem 22 has a disk 23 on its lower end disposed in the bore of the stem 18. A filling valve 24 is screwed onto the upper end of the chamber 19 and is ground to engage in the seat 14. The stem 18, chamber 19 and valve 24 constitute an inlet valve member which is free to move upwardly and unseat so that fluid may flow in thru the ports 16 and pass up thru the seat 14 to the housing 10.

Thus when the device is moved downwardly in the oil in the well, the inlet valve 24 is opened and the oil permitted to pass up thru the housing to the lifting medium connected by the collar 12. This medium may be a swab, packer, boiler or other device. When the up-stroke of the device is started it is desirable not to overload the lifting medium, by collecting an excess of oil therein, therefore means for discharging such excess is required.

For this purpose the valve 24 has a central valve seat 25 inclined oppositely to the seat 14 and receiving a relief valve 26 mounted on the upper end of the stem 22 and engaging said seat 25 from the chamber 19. The stem 22 and valve 26 constitute a relief valve member.

The valve 26 must sustain the weight or downward pressure exerted by the liquid collected above the valve and to this end a coiled spring 27 is confined in the tubular stem 18 and supports the disk 23, whereby the valve 26 is held to its seat. It is evident that by varying the tension of the spring the valve 26 may be regulated to open at a predetermined pressure.

For this purpose a plug 28 is screwed into the lower end of the bore of the tubular stem 18, which is internally screw threaded. The plug receives the lower end of the spring 27 and screwing the plug up into the stem, the tension of the spring is increased and the valve 26 is held to resist a greater downward pressure.

One of the important features of the invention is means for locking the plug in its adjusted position and a graduated scale, whereby the plug may be adjusted to a given point to cause the valve 26 to sustain a pressure up to a predetermined point and to open at an excessive pressure. The plug has a screw threaded reduced shank 29 passing loosely thru a washer 30 bearing against the bottom of the stem 18. A lock nut 31 mounted on the shank is screwed up against the washer, while a jamb nut 32 is screwed up against the nut 31. A vertical panel 33 is provided on the shank and is stamped with numerals or other gauge marks. The lower surface of the nut 32 is used in conjunction with the gauge to determine the adjustment of the plug 28, whereby the spring 27 is placed under the desired tension.

It will be seen that by screwing the plug 28 up until the gauge mark 40 registers with the lower face of the nut 32, the spring 27 will be placed under such tension as to cause the valve 26 to sustain the pressure or load indicated by the mark 40, before opening. The proper adjustment having been made the valve 26 will relieve an excess load, but will sustain a predetermined maximum load.

In Figs. 4 to 7 I have shown a modified preferred form of structure which includes a cylindrical housing 10', a neck 11' and a collar 12'. A cylindrical valve cage 13' is screwed into the lower end of the housing and is flush therewith. In the upper end of the cage is formed a concaved valve seat or socket 14' and a round head inlet valve 24' engages in the seat. The valve has a depending shank 34 from which a tubular stem 18' hangs. A cylindrical relief valve 26' is slidable in a smooth bore 35 in the valve 24' and has a disk 23' at its lower end supported on a coiled spring 27' in the stem.

Downwardly inclined diametrically opposite ports 36 extend from the bore 35 thru the upper end of the shank 34, while diametrically opposite inclined ports 37 at right angles to the ports 36 are disposed at a lower level than said ports 36. Normally the valve 26' closes the ports, but when subjected to an excessive pressure and depressed, will first uncover the ports 36 down to a certain point, at which the ports 37 will be uncovered. If the excess load is not at first relieved, the valves will be opened sufficiently to give relief. A plug 28' is screwed into the bottom of the stem and has a shank 29' passing thru a washer 30' and receives a lock nut 31' and a jamb nut 32', the same as in Fig. 1. The shank 29 also has a gauge panel 33' suitably marked.

The round-head valve 24' permits the stem 18' to swing and the latter is loosely confined in an enlarged collar 38 supported by a spider 39 cast in the lower end of the cage 13'. By reason of the round-head valve and concaved seat together with the swinging stem, the valve will more readily seat and any obstruction on the seat 14' is more likely to be worked out. The collar gives the stem freedom of movement, but at the same time affords a guide for the upward movement of the stem.

In operation the plug 28 is adjusted by first loosening the nuts 31 and 32 and then screwing the shank 29 up until the desired mark on the gauge 33 registers with the lower face of the nut 32, after which the nuts are tightened. This adjustment places the spring under a predetermined tension, whereby the valve 26 will sustain a predetermined pressure or load before opening. The gauge enables this adjustment to a very close degree. The collar 12 is then screwed onto the oil lifting medium, (not shown) and the same lowered into the well.

On the down stroke of the device the pressure of the oil entering the cage 13 thru the ports 16 will lift the valve 24, whereby the oil is allowed to freely flow thru the housing and into the lifting medium. On the upstroke of the device, if the oil which has been collected above the valve 24, which seated at the start of said stroke, exceeds the predetermined load and thus becomes excessive to lift, such excessive pressure will overcome the tension of the spring 27 and unseat the valve 26. When the valve 26 is opened the oil will flow down into the chamber 19 and out thru the ports 20. The valve 26 will remain open until the tension of the spring overcomes the pressure on said valve.

By this arrangement the device can be made to hold a maximum load by a definite adjustment before being lowered into the well. This is made possible by the gauge 33. By confining the spring 27 in the tubular stem it is protected from the flowing oil and sand and has a tendency to function more regularly.

Various changes in the size and shape of the elements as well as modifications may be made within the scope of the appended claims.

What I claim, is:

1. In a relief valve device, a housing having a pipe coupling, a valve cage mounted in the housing and having an annular valve seat, a main valve engaging upon said seat and depending therethrough, said valve having a vertical bore and an inlet port intersecting said bore, a piston valve slidable in said bore, a stem depending from the main valve, and variable tension means in said stem and engaging said piston valve for normally sealing the same.

2. In a relief valve device, a housing having a pipe coupling, a valve cage connected to the housing and having an annular valve seat, a valve head having engagement in the seat of the cage and provided with an axial bore, the head having ports entering below the valve seat of the cage and intersecting the bore, a tubular stem depending from the valve head, a piston valve slidable in the bore of the head, a coiled spring in the stem engaging the piston valve and means at the lower end of the stem for varying the tension of the spring.

3. In a relief valve device, a cylindrical housing, a valve cage attached to the lower end of the housing having oil openings therein and provided with a valve seat above its oil openings, an elongated tubular valve stem guide at the lower end of the cage, an oil inlet valve member having oil openings for discharging oil from the housing, a relief valve carried by the inlet valve member and normally preventing the discharge of oil from the housing, a tubular stem depending from the inlet valve member and extending thru said guide, a coiled spring confined in said stem and sustaining said relief valve, an adjustable plug in the lower end of the stem, a screw threaded shank depending from the plug below the stem and having a longitudinal gauge panel, an abutment at the lower end of the stem, and a pair of lock-nuts mounted on the shank engaging the abutment and co-acting with the marks of the gauge panel to fasten the plug in position for tensioning the spring to sustain the relief valve against a predetermined load indicated by said marks.

4. In a relief valve device, a cylindrical housing having a pipe coupling at its upper end, a valve cage having its upper end screwed into the housing, said cage having an annular valve seat in its upper end, an annular main valve seating downwardly on said seat a chamber suspended from the valve, said valve having a relief valve seat relatively within the chamber, the cage and chamber having fluid passage openings, a guide depending from the cage, a tubular stem depending from the chamber and slidable in the guide, a relief valve seating upwardly in the seat of the main valve, a stem depending from the relief valve and slidable in the tubular stem, resilient means in the tubular stem supporting the stem of the relief valve, and adjustable means carried by the tubular stem for varying the tension of the resilient means.

5. In a relief valve device, a cylindrical housing having a pipe coupling at its upper end, an enlarged valve cage having its upper end screwed into the housing, said cage having an annular valve seat in its upper end, an annular main valve seating downwardly on said seat, a chamber suspended from the valve, said valve having a relief valve seat relatively within the chamber, the cage and chamber having fluid passage openings, a tubular guide depending from the cage, a tubular stem depending from the chamber and slidable in the tubular guide, a relief valve seating upwardly in the seat of the main valve, a stem depending from the relief valve into the tubular stem, a coiled spring in the tubular stem supporting the stem of the relief valve, a vertically adjustable element in the lower end of the tubular stem supporting the spring and for varying the tension of the latter, and locking means on said element for fastening it in adjusted positions.

6. In a relief valve device, a cylindrical housing having a pipe coupling at its upper end, an enlarged valve cage having its upper end screwed into the housing, said cage having an annular valve seat in its upper end, an annular main valve seating downwardly on said seat, a chamber suspended from the valve, said valve having a relief valve seat relatively within the chamber, the cage and chamber having fluid passage openings, a tubular guide depending from the cage, a tubular stem depending from the chamber and slidable in the tubular guide, a relief valve seating upwardly in the seat of the main valve, a stem depending from the relief valve into the tubular stem, a coiled spring in the tubular stem supporting the stem of the relief valve, a vertically adjustable element in the lower end of the tubular stem supporting the spring and for varying the tension of the latter, locking means on said element for fastening it in adjusted positions, and a gauge on the adjustable element exposed below the tubular stem and indicating the degree to which the spring is tensioned.

7. As a sub-combination in a relief valve device, a tubular valve stem having a guide at its upper end, a relief valve having a cylindrical stem depending through the guide of the tubular stem, a coiled spring in the tubular stem engaging and supporting the cylindrical stem, a plug screwed into the lower end of the tubular stem and adjustably supporting the spring, lock nuts for fastening the plug in adjusted positions, and an extension from the plug bearing graduations and registering with the lock nuts.

In testimony whereof I affix my signature.

ROBERT A. WILSON.